(No Model.)
A. LOTT.
FENCE.
No. 377,682. Patented Feb. 7, 1888.
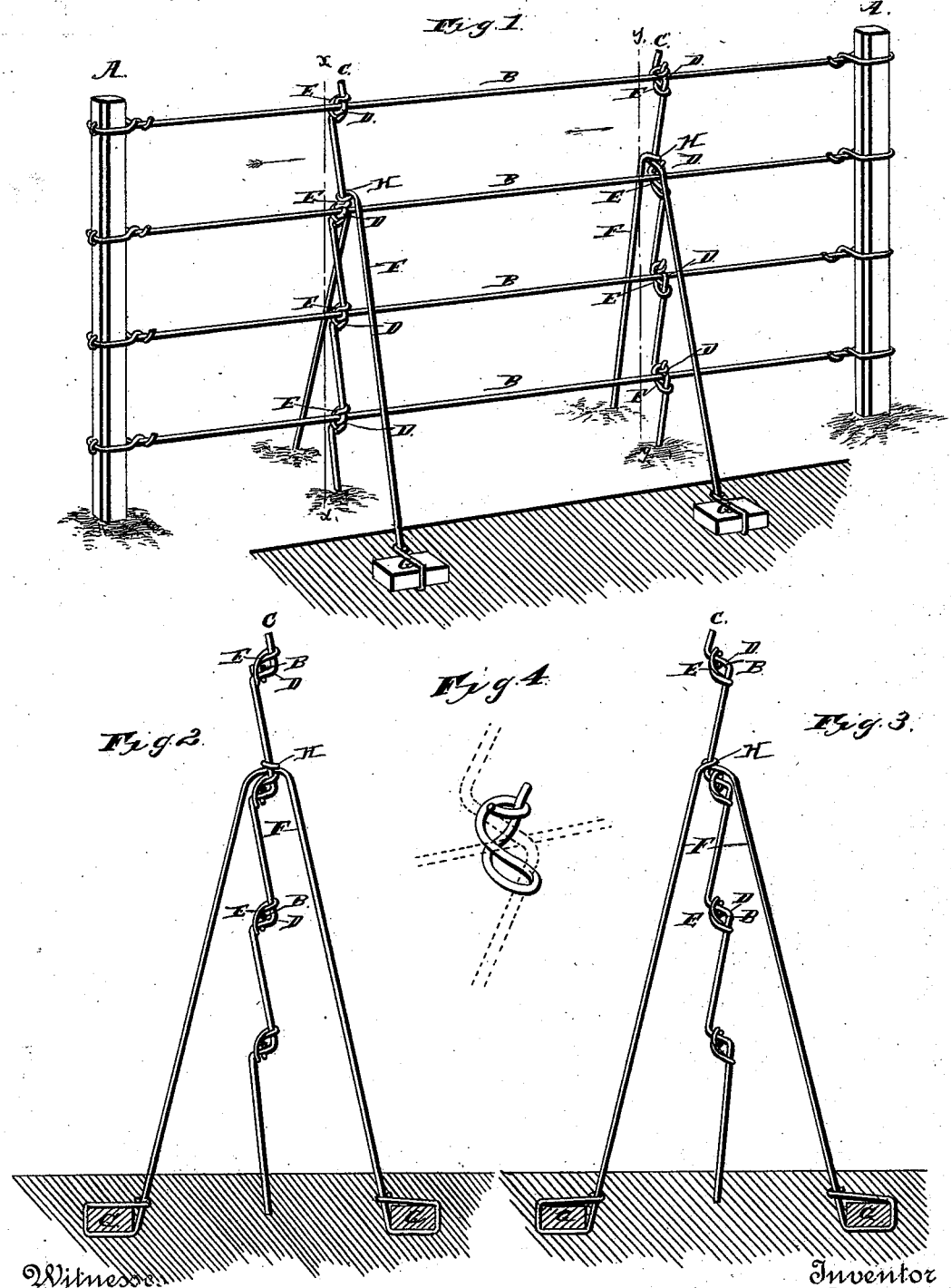
Witnesses:
Inventor
Arthur Lott
By his Attorneys

UNITED STATES PATENT OFFICE.

ARTHUR LOTT, OF RIDDLEVILLE, TEXAS.

FENCE.

SPECIFICATION forming part of Letters Patent No. 377,682, dated February 7, 1888.

Application filed October 27, 1887. Serial No. 253,533. (No model.)

*To all whom it may concern:*

Be it known that I, ARTHUR LOTT, a citizen of the United States, residing at Riddleville, in the county of Karnes and State of Texas, have invented new and useful Improvements in Fences, of which the following is a specification.

My invention relates to improvements in fences; and it consists in certain novel features, hereinafter described and claimed.

In the annexed drawings, Figure 1 is a perspective view of a fence embodying my invention. Fig. 2 is a vertical section on the line $x$ $x$ of Fig. 1. Fig. 3 is a similar view on the line $y$ $y$ of Fig. 1, and Fig. 4 is a detail perspective view of the connection between the fence and stay-wires.

Referring to the drawings by letter, A A designate the posts, to and between which the wires B are strung in the usual manner.

At stated intervals along the panels I provide the braces or stay-rods C, which are bent to form a series of steps or rests, D, along their length, as clearly shown.

The stay-rods are arranged so that the wires B of the fence will pass through the angles formed by the steps thereof, and they are also arranged so that the said wires B will pass alternately above and below the steps—that is to say, that the steps of one stay-rod will pass over the fence-wires and the steps of the next adjacent stay-rod will pass under the same. The lower ends of the stay-rods are made to enter the ground, and the fence-wires are secured to said stay-rods by means of tie-wires E, which are doubled on themselves around the stay-rods and then passed across the angle of the same to the steps of the same, where they are secured. I have thus provided a very simple and efficient arrangement for preventing longitudinal and vertical movement of the fence; and in order to prevent lateral play or movement of the fence I provide the anchor-braces F, which have their ends passed transversely around anchor-blocks G, buried in the ground on opposite sides of the fence, and their central portions twisted around the stay-rods near the upper ends of the same, as shown at H.

From the foregoing description, taken in connection with the accompanying drawings, it will be seen that I have provided a cheap, light, and simple fence which will not be blown down by the wind and will resist all heavy forces or shocks put upon it.

Having thus described my invention, what I claim, and desire to secure by Letters Patent, is—

1. The combination of the fence-wires, the stay-rods having their lower ends fitted in the ground and provided with a series of steps or rests fitted to the fence-wires, a series of tie-wires securing the fence-wires to said steps, and braces twisted around the stay-rods near the upper ends thereof and having their ends secured to buried anchors, substantially as specified.

2. The combination, with the fence-wires, of the stay-rods secured thereto and having a series of steps, the steps of one stay-rod passing over the fence-wires, while the steps of the adjacent stay-rod pass under the fence-wires, and a series of tie-wires securing the said fence-wires to said steps, substantially as specified.

In testimony that I claim the foregoing as my own I have hereto affixed my signature in presence of two witnesses.

ARTHUR LOTT.

Witnesses:
F. D. DEAHOZA,
L. C. MITCHELL.